United States Patent [19]
Williams et al.

[11] Patent Number: 5,135,700
[45] Date of Patent: Aug. 4, 1992

[54] METHOD AND APPARATUS FOR MOLDING A THREADED PRODUCT

[75] Inventors: Brian L. Williams, Nappanee; Gail J. Morehead, Elkhart, both of Ind.

[73] Assignee: NIBCO Inc., Elkhart, Ind.

[21] Appl. No.: 610,150

[22] Filed: Nov. 6, 1990

[51] Int. Cl.⁵ ............................................. B29D 1/00
[52] U.S. Cl. ...................................... 264/318; 249/59; 249/68; 249/145; 425/438; 425/577; 425/DIG. 58
[58] Field of Search .................... 264/318; 249/59, 68, 249/145; 425/438, 577, DIG. 58

[56] References Cited
U.S. PATENT DOCUMENTS

| | | | |
|---|---|---|---|
| 3,060,509 | 3/1960 | McCubbins | 425/577 |
| 4,240,498 | 12/1980 | Frenette | 425/577 |
| 4,565,518 | 1/1986 | Attman et al. | 264/318 |
| 4,959,007 | 9/1990 | Okuyama | 249/59 |

*Primary Examiner*—David A. Simmons
*Assistant Examiner*—Merrick Dixon
*Attorney, Agent, or Firm*—Price, Heneveld, Cooper, DeWitt & Litton

[57] ABSTRACT

A method and apparatus for molding a product having internal threads includes a threaded mold core and a device for rotating the mold core about the axis of its threads and for axially withdrawing the core from the mold at a rate that is related to the rate of rotation, according to the pitch of the threads. This is accomplished by a cam, which is rotated in synchronism with the device that rotates the core, and a follower for displacing the core as the cam is rotated. The cam follower is fixed with respect to the mold. The cam and threaded core are positioned on a carrier, along with the device for rotating the core, such that rotation of the cam displaces the carrier away from the mold. The core is inserted into the mold, prior to the molding process, by displacing the carrier toward the mold without rotating the core. In one embodiment, the cam is rotated by a uni-directional motor such that resetting of the cam after the core is withdrawn is accomplished by forward indexing of the cam a small amount to a zero position.

30 Claims, 10 Drawing Sheets

METHOD AND APPARATUS FOR MOLDING A THREADED PRODUCT

BACKGROUND OF THE INVENTION

This invention relates generally to a molding method and apparatus and more particularly to a method and apparatus for molding a product having internal threads. More particularly, the invention relates to withdrawal of a threaded mold core from the molded product. The invention is especially useful for manufacturing products made from polymers.

The injection molding of a product using polymers or like material, requires a mold having an inverse image of each surface of the product. For internal cavities, it is necessary to provide a mold core that is separate from the mold and is withdrawn in a direction different from the direction of separation of the mold halves. When the internal cavity includes a threaded surface, the mold core cannot be simply axially withdrawn because such would interfere with the newly formed threads. Nor can the newly formed threads serve as a guide for threadably backing-out the core because such newly formed threads do not have sufficient strength at the time that the mold core must be removed.

One solution has been to support the mold core with a metal lead screw and nut having mating threads which correspond to the pitch of the molded threads in order to carry all of the load of withdrawal of the core and thereby avoid deforming of the plastic threads. The problem with this approach to core withdrawal is that an equal amount of time is required to reset the mold core by reversing rotation of the drive motor to re-thread the lead screw in the nut. Another problem proper is repositioning of the core. Because the core must be precisely repositioned against the mold, a low-fluid pressure source must be applied to the drive motor in order to avoid damage to the mold or core from excess torque. However, the low-fluid pressure is insufficient to break loose the core from the newly formed threads, so the drive motor must be switched between high and low pressure sources.

In order to overcome this difficulty, it has been proposed to mount the mold core on a carrier and to control the movement of the carrier with a lead screw, which is rotated concurrently with the core. The core is reset by forwarding the carrier against a fixed stop. This overcomes the necessity of providing a low pressure source for resetting of the core and allows for a reduction in components in order to service an injection molding apparatus having multiple cores. However, several problems remain. The time duration to reset the core withdrawal mechanism is likewise as lengthy as the time to actually withdraw the core because the lead screw must be rotated in reverse to reset the carrier. Importantly, mold changeover for a different product is exceptionally time-consuming and requires a large stock of components on-hand in order to accommodate various thread pitches.

Conventional injection molding machines have employed a control theory based on the assumption that the steps performed in the process of bringing together the mold components in order to form the product will be carried out in reverse sequence when disassembling the mold components in order to remove the final product from the mold. Therefore, controls on existing plastic molding machine designs, reinforce the necessity for reinserting a threaded mold core in a manner that is a precise mirror image of the method of withdrawing the mold core. Any deviation from this control philosophy would be considered incompatible with existing plastic molding machines, and hence, impractical because retrofit of existing molding machines would be prohibited.

SUMMARY OF THE INVENTION

The present invention provides a method and apparatus for molding a product having internal threads that provides exceptional flexibility to allow adaptation to products having different thread pitches with minimal change-over time required. The invention is additionally directed to reducing the cycle time for molding products having internal threads by utilizing techniques for reinsertion of the mold core in a much shorter time than withdrawal of the mold core. This is accomplished in a manner that provides compatibility with existing plastic molding machines whose controls require mirror image cyclical sequencing of steps.

The invention is embodied in an apparatus for withdrawing a mold core having threads from a mold used in a molding machine. The apparatus includes core rotation means for rotating the core about the axis of its threads and means for axially withdrawing the core from the mold at a rate that is related to the rate of rotation of the rotating means as a function of the pitch of the threads. The withdrawal means includes a cam moved in synchronism with the core rotation means and displacement means for axially displacing the core in response to the cam surface.

In one embodiment of the invention, a carrier is provided that is displaceable along the axis of the core threads and the core rotation means is mounted to the carrier along with the cam. By fixing the cam follower with respect to the mold, the movement of the cam surface displaces the carrier and, along with it, the mold core. Insertion means, which are actuated after the formed product is removed from the mold, are provided for inserting the mold core into the mold without substantially rotating the mold core. In this manner, the mold core can be reset by a more rapid axial movement.

According to another aspect of the invention, the cam follower includes a work support that is positioned between the mold and cam surface for selectively adapting the length of the cam follower to the position of the cam surface. This allows the core withdrawal cycle to begin without the necessity of precisely positioning the cam at the beginning of each withdrawal cycle because the support member accommodates significant variations in the cam surface starting position.

According to yet another aspect of the invention, the cam is rotated by a uni-directional motor such that resetting of the cam after core withdrawal is accomplished by forwardly indexing the cam a small amount to its zero position. This saves time by eliminating the time consuming reverse rotation of the cam. In order to provide compatibility with conventional plastic molding machines, means are provided for indicating to the molding machine controller that a particular sequence of events have occurred in a symmetrical order even though the control sequence occurs assymmetrically.

These and other objects, advantages and features of this invention will become apparent upon review of the following specification in conjunction with the drawings.

DESCRIPTION OF THE PREFERRED EMBODIMENT

Figure 1:
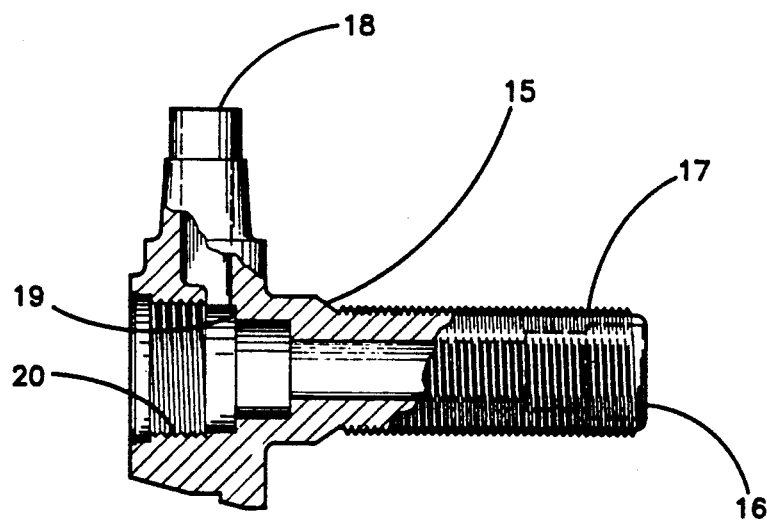
FIG. 1 is partially sectioned front elevation of a threaded product made according to the present invention.

Refer now specifically to the drawings, and the illustrative embodiments depicted therein, a fitting 15, such as a faucet valve T, includes an inlet 16 having an externally threaded surface 17 and an outlet 18 joined at a common cavity 19 (FIG. 1). Cavity 19 includes an internally threaded surface 20 for threadable receipt of an adjustable stop valve (not shown) in order to form a faucet valve. Fitting 15 is manufactured from a blend of polymers such as ABS or PVC by injection molding at approximately 5000 psi.

An apparatus 21 for producing fitting 15 includes a plastic molding apparatus 22 having an upper mold half 24, a lower mold half 26, a core insert 28, a core pin 29 and a threaded core insert 30 (FIGS. 2-5). Lower mold half 26 is mounted to a mold base 32 and upper mold half 24 is mounted to a mold cap 34. Mold halves 24, 26 define the features of the exterior surface of fitting 15 including threaded surface 17. Core insert 28 forms the stepped interior passage of inlet 16, best seen in FIG. 1. Core pin 29 forms the interior passage of outlet 18 and threaded core insert 30 forms internal cavity 19 including internally threaded surface 20. Threaded core insert 30 includes a portion 36 having external threads that are the mirror image of threaded surface 20 and a portion 38 that fits deeper into the cavity defined between mold halves 24, 26 in order to form the passage from inlet 16 to cavity 19. Core pin 29 is attached to mold cap 34 such that when mold cap 34 is opened upwardly, core pin 29 is cleared from fitting 15. Core insert 28 is readily removable by axial withdrawal means (not shown) which imparts an axial movement to core insert 28. An ejector pin 40 is actuated by an ejector plate 42 at the end of a molding cycle, under the control of the conventional controls 44 (FIG. 11) of molding apparatus 22 to remove fitting 15 after the core inserts are withdrawn.

Figure 6:
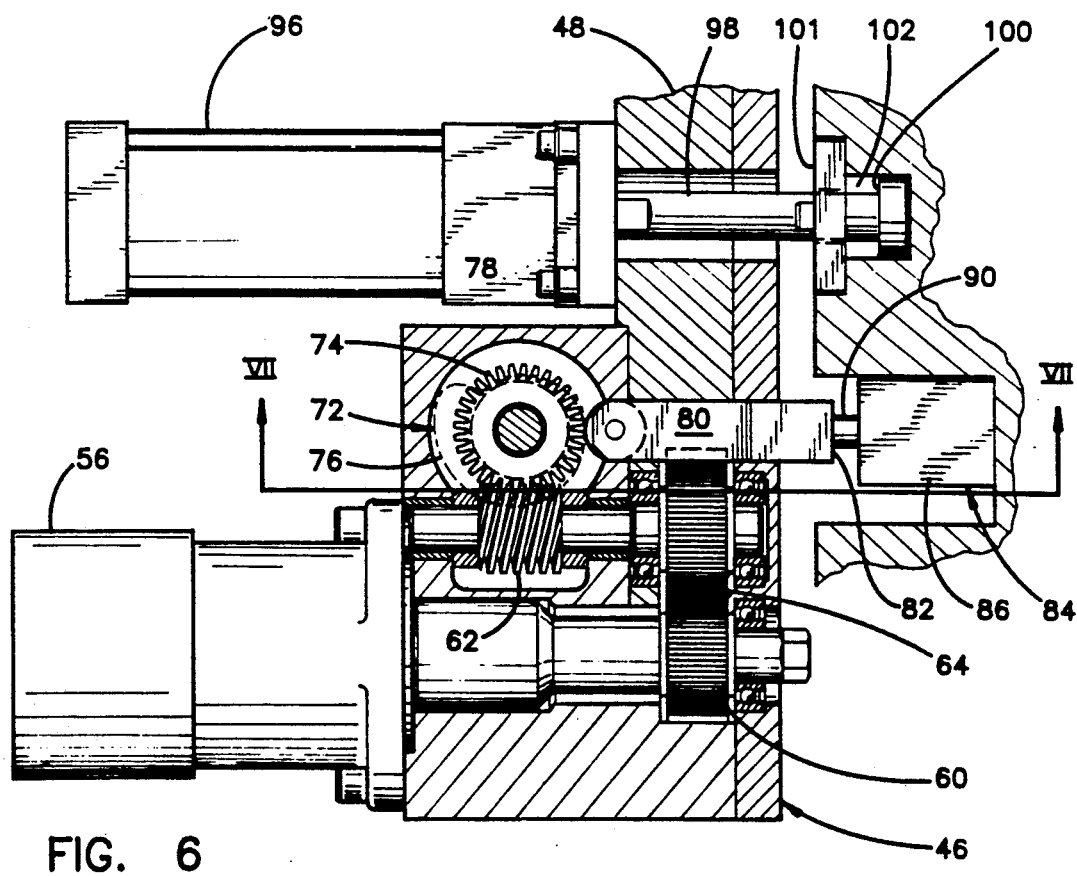
FIG. 6 is a partial sectional plan view taken along the lines VI—VI in FIG. 2.
Figure 8:
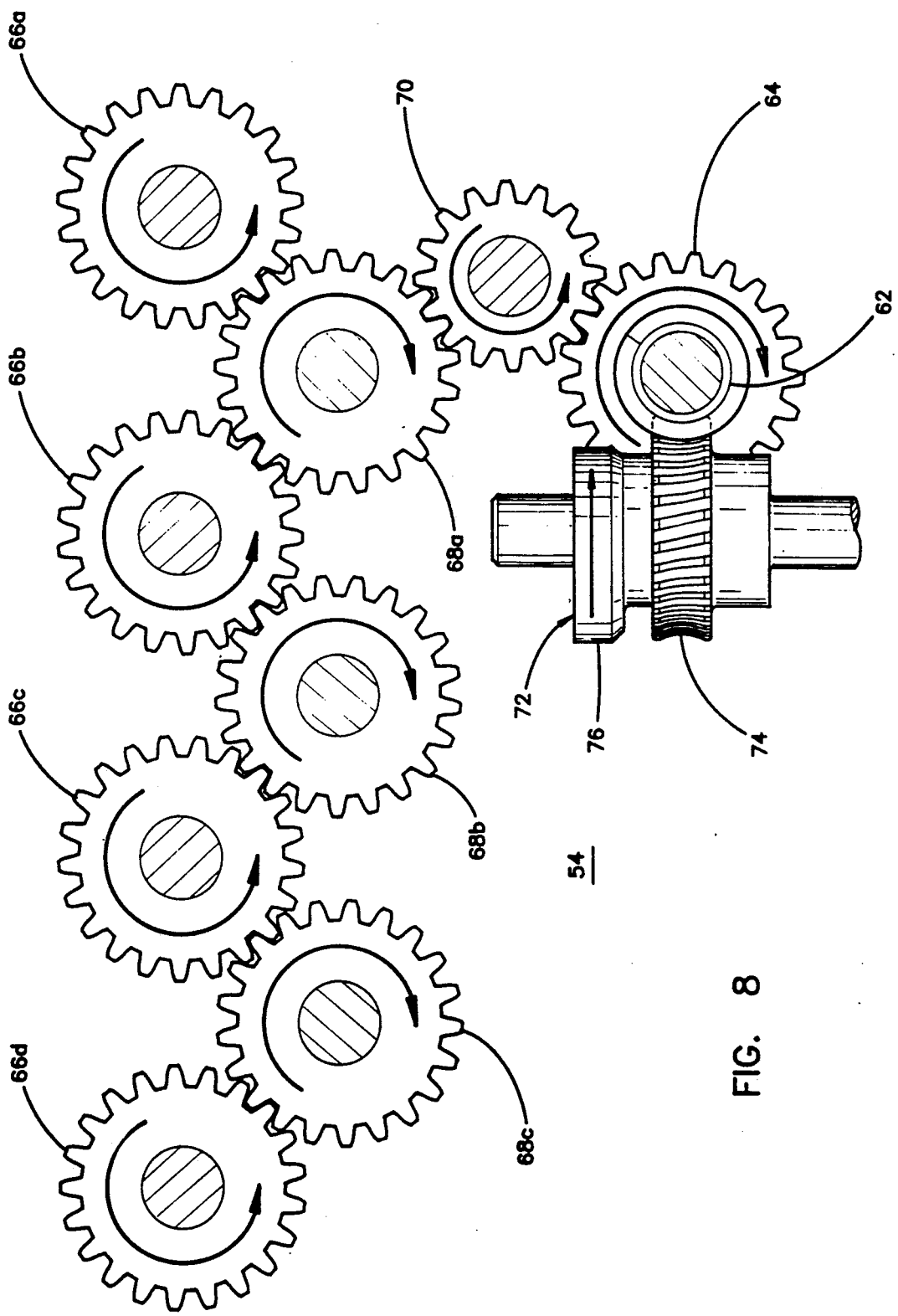
FIG. 8 is an end elevation taken along the lines VIII—VIII in FIG. 2.

Because of the threaded engagement between threaded portion 36 of threaded core insert 30 and the newly formed internal threads 20 of fitting 15, it is necessary to rotate and axially withdraw core insert 30 at rates that are determined by the pitch of internal threads 20. This is accomplished by a core withdrawing mechanism generally illustrated at 46. Core withdrawal mechanism 46 includes a carrier 48 that moves with respect to molding apparatus 22 along axis X of threaded core insert 30, which is from left to right as illustrated in FIGS. 2-5. Carrier 48 rides on guide pins and a jib, which are not shown for clarity. Core withdrawal mechanism 46 includes a forward bearing assembly 50 which is fixedly attached to carrier 48, for movement therewith, in order to rotatably support a shaft 52 extending from core 30 to a drive gear assembly 54. Shaft 52 is rotatably driven through drive gear assembly 54 by a hydraulic orbit motor 56 (FIGS. 6 and 8). Referring to FIGS. 6 and 8, an output gear 60 of motor 56 drives a worm 62 through an intermediate gear 64. Gear 64, in turn, rotates drive gears 66$a$, 66$b$, 66$c$ and 66$d$ by way of idler gears 68$a$, 68$b$ and 68$c$ as well as an intermediate gear 70. Four drive gears 66$a$–66$d$ are illustrated, and each drive gear rotates the shaft 52, and hence, the threaded core insert 30, for one mold pair 24, 26. Accordingly, the illustrated core withdrawing mechanism is capable of servicing multiple molds and, in the illustrated embodiment, is servicing four molds. Hydraulic motor 56 and drive gear assembly 54 are all mounted to carrier 48 and moveable therewith. In the illustrated embodiment, motor 56 is commercially available and is marketed by Charlynn Company under Model No. 103-1032-007(s).

Core withdrawal mechanism 46 additionally includes a cam 72 which is driven from worm 62 by worm gear 74 (FIGS. 2-8). Because output gear 60 from hydraulic motor 56 drives both cam 72 and drive gears 66$a$–66$d$ via worm 62, the rate of rotation of drive gears 66 and cam 72 are synchronized according to a relationship that will be explained in more detail below.

Cam 72 includes a cam surface 76 which is contacted by a cam roller 78 positioned at the end of a cam follower 80. An opposite end 82 of cam follower 80 engages a hydraulic work support 84 that is mounted to mold base 32. Work support 84 includes a base 86 mounted within a cavity 88 in mold base 32. Work support 84 additionally includes a stop 90 which engages opposite end 82 of cam follower 80. When hydraulic pressure is not being applied to work support 84, stop 90 freely moves with respect to base 86. When, however, hydraulic pressure is applied to work support 84, stop 90 becomes fixed with respect to base 86 and, hence, with respect to mold base 32. In the illustrated embodiment, work support 84 is a commercially available hydraulic work support marketed by Hytec Company under Model No. 100229. A compression spring 92 is engaged by a pin 94 extending from cam follower 80 for the purpose of biasing the cam follower against cam surface 76.

Cam 72 is mounted to carrier 48 and, as set forth above, is driven by hydraulic motor 56. Because hydraulic work support 84 is mounted to mold base 32 and because, when actuated, stop 90 freezes the position of cam follower 80 with respect to the work support, which is mounted to mold base 32, the rotation of cam 72 will cause carrier 48 to move away from mold base 32, as the portion of the cam surface 76, engaged by follower 80, increases in diameter. Because hydraulic motor 56 causes rotation of both cam 72 and shaft 52, upon which threaded core insert 30 is mounted, carrier 48 moves outwardly from mold base 32 from the position illustrated in FIG. 3 to that in FIG. 4 at a rate that is related to the rate at which the core insert 30 is rotated which is a function of the pitch of the threads on surface 20 of fitting 15.

A double acting hydraulic cylinder 96, which is also mounted to carrier 48 includes a shaft 98 that is both extendable and retractable under power (FIG. 6). Shaft 98 terminates in an enlarged portion 100 which is captured within a cavity 102 in mold base 32. An apparatus cover plate 101 extends over the opening of cavity 102 to capture enlarged portion 100 within cavity 102. Enlarged portion 100 is sized to be axially shorter than the axial depth of cavity 102 by an amount equal to the extent of travel of stop 90 of work support 84 for reasons that will be set forth in more detail below. With this arrangement, when shaft 98 is extended by hydraulic cylinder 96, carrier 48 moves away from molding apparatus 22 from the position illustrated in FIG. 4 to the position illustrated in FIG. 5. When shaft 98 is retracted by hydraulic cylinder 96, carrier 48 is moved inwardly toward molding apparatus 22 from the position illustrated in FIG. 5 to the position illustrated in FIG. 3. In the illustrated embodiment, hydraulic cylinder 96 is commercially available and is marketed by Hydro-Line Company under Model No. R5UD, with a 2.5 inch bore, 3.0 inch stroke, 1.0 inch rod diameter and cushions on both ends.

Figure 2:
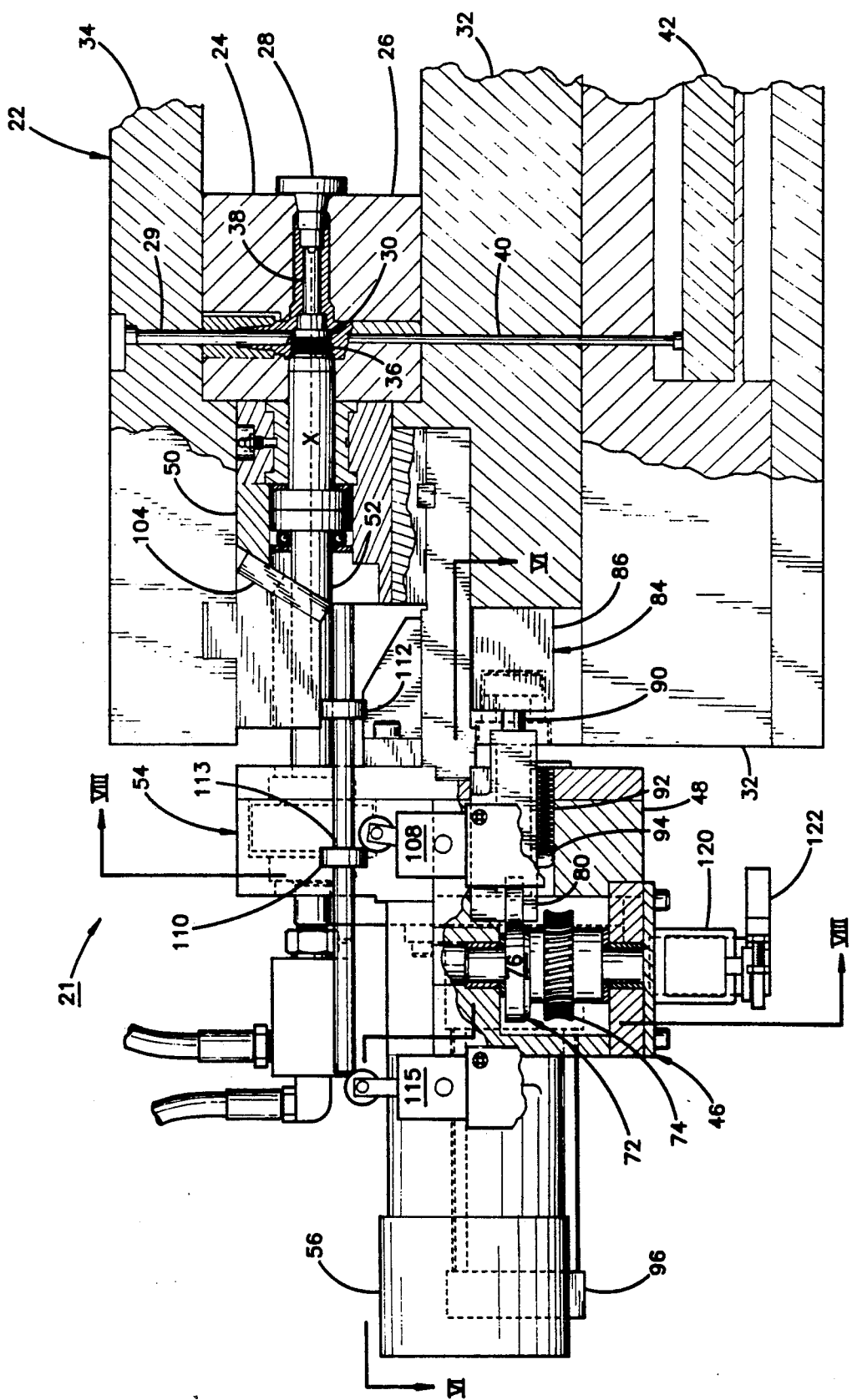
FIG. 2 is a side elevation of an apparatus according to the invention at one portion of its cycle of operation.
Figure 5:
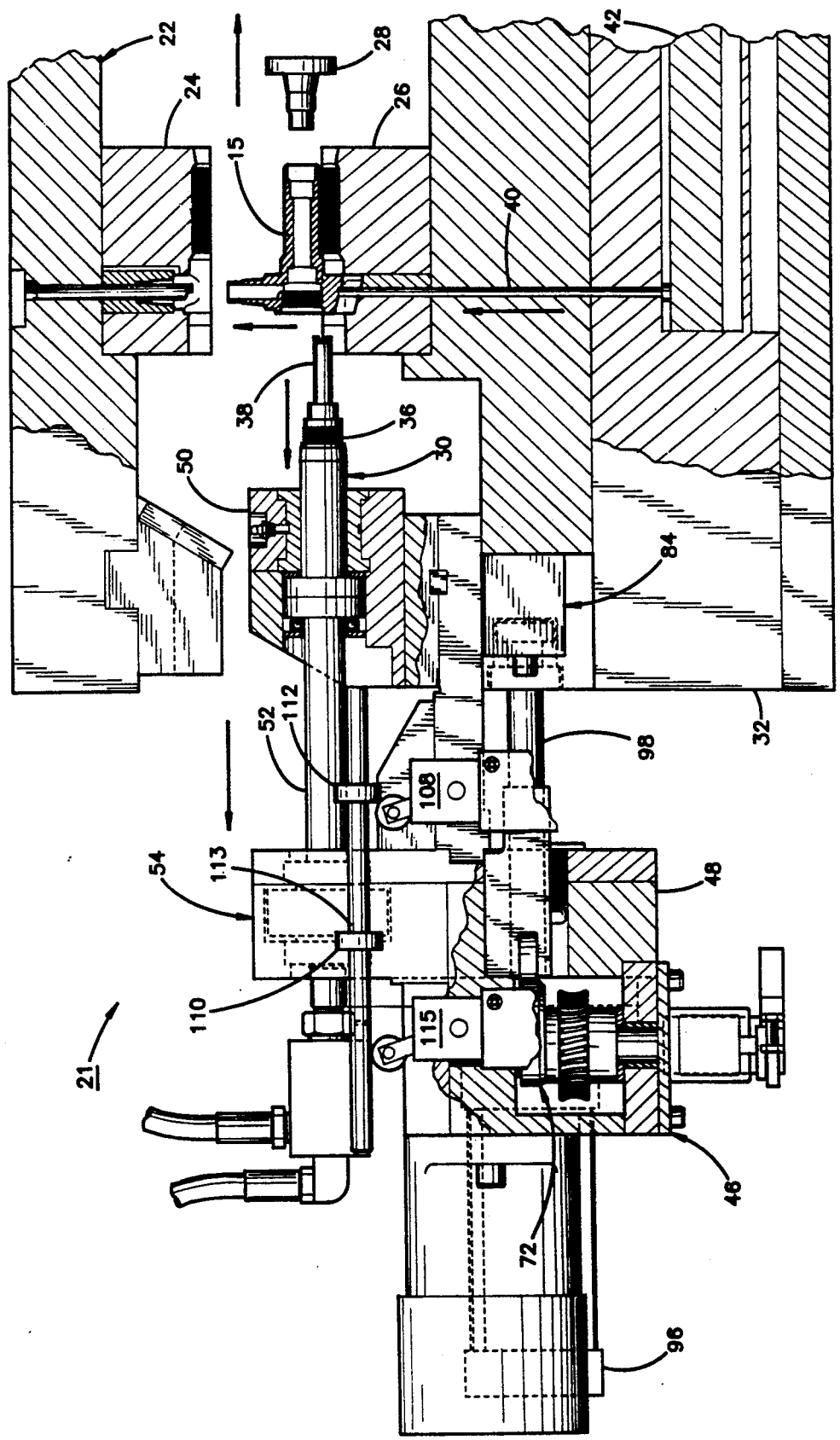
FIG. 5 is the same view as FIG. 2 at yet another portion of the cycle of the apparatus.
Figure 7:
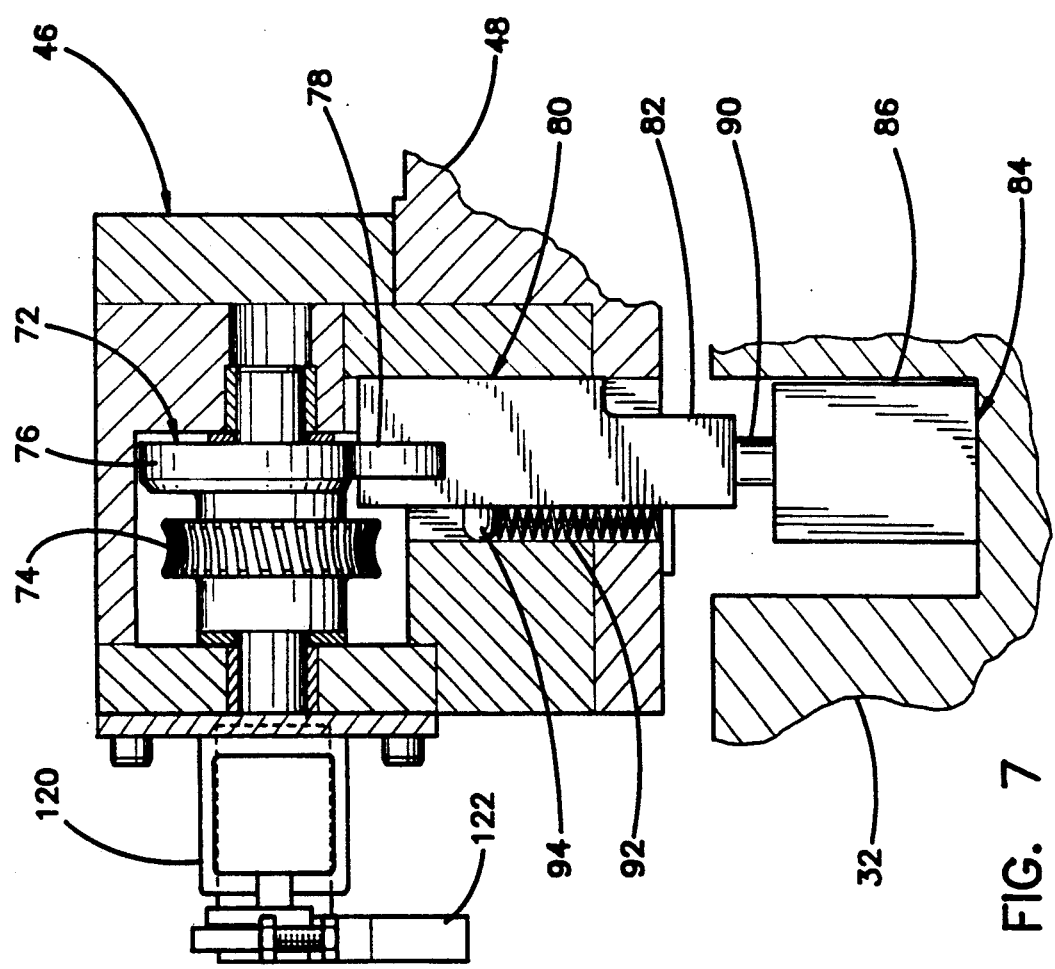
FIG. 7 is a partially sectioned side elevation taken along the lines VII—VII in FIG. 6.

Mold cap 34 includes a heel plate 104 which will contact a surface 106 of bearing assembly 50 when mold cap 34 closes in order to firmly position bearing assembly 50, and hence, threaded core insert 30, in the proper location with respect to mold halves 24, 26 during the molding process as illustrated in FIG. 2. When core insert 30 is fully withdrawn, as illustrated in FIG. 5, core insert 28 is withdrawn by conventional means (not shown) and ejector pin 40 is forced upwardly by ejector plate 42 under the control of conventional molding apparatus control 44.

A double-acting-center-neutral switch 108 is mounted to mold base 32 and is actuated by limits 110 and 112 on an actuating bar 113, mounted to carrier 48 and moveable with core 32. Limit 110 is a "cylinder set" actuator which actuates a switch contact 126 (FIG. 4) when core insert 30 is fully set within mold halves 24, 26. Limit 112 is a "cylinder out" actuator which actuates contacts 128 of switch 108 when threaded core insert 30 is fully withdrawn, or pulled, from between mold halves 24, 26. A single-acting switch 115 is also mounted to mold base 32 and is actuated directly by actuating bar 113 when threaded core insert 30 is part way out and beyond. Switch 115 jointly actuates a pair of switch contacts 117 and 118, opening one while closing the other. A cam zero switch 120 includes an actuator 122 which rotates in unison with cam 72 and actuates a switch contact 124 whenever cam 72 is in a "zero" position. As will be set forth in more detail below, the "zero" position for cam 72 has great tolerance and, in the illustrated embodiment, extends from 300° to 360° in the cam circle.

Switch contacts 117, 118, 124, 126 and 128 are wired to a controller 130. Switch 126 received a signal on a line 121 and provide a "cyl set" signal on line 123. Switch 128 receives a signal on line 127 and provides a "cyl set" signal on a line 129. Switch 124 receives a signal on line 125 and is connected in series with both switches 117 and 128. Switch 118, in turn, provides a "screw out" signal on line 116, and switch 117, in turn, provides a "screw in" signal on a line 119. Controller 130 may be implemented by relay logic, by a programmable controller, or by some other form of control device, such as a custom design microprocessor-based control, and may be separate from or integral with molding apparatus control 44. If separate from control 44, controller 130 includes outputs are provided as inputs that to conventional molding apparatus control 44. Control 44 in turn includes outputs to energize a "pull" solenoid coil 140 and "set" solenoid coil 142. Coils 140 and 142 act on the same hydraulic valve 144, whose function will be set forth below. Control 44 additionally includes outputs to energize a "pull" solenoid 146 and a "set" solenoid 148 which, likewise, actuate in unison a common hydraulic valve 150. Control 44 additionally has outputs 152 which control the operation of molding apparatus 22 and outputs 154 which provide information to controller 130 about the cycle status of molding apparatus 22.

Figure 10:
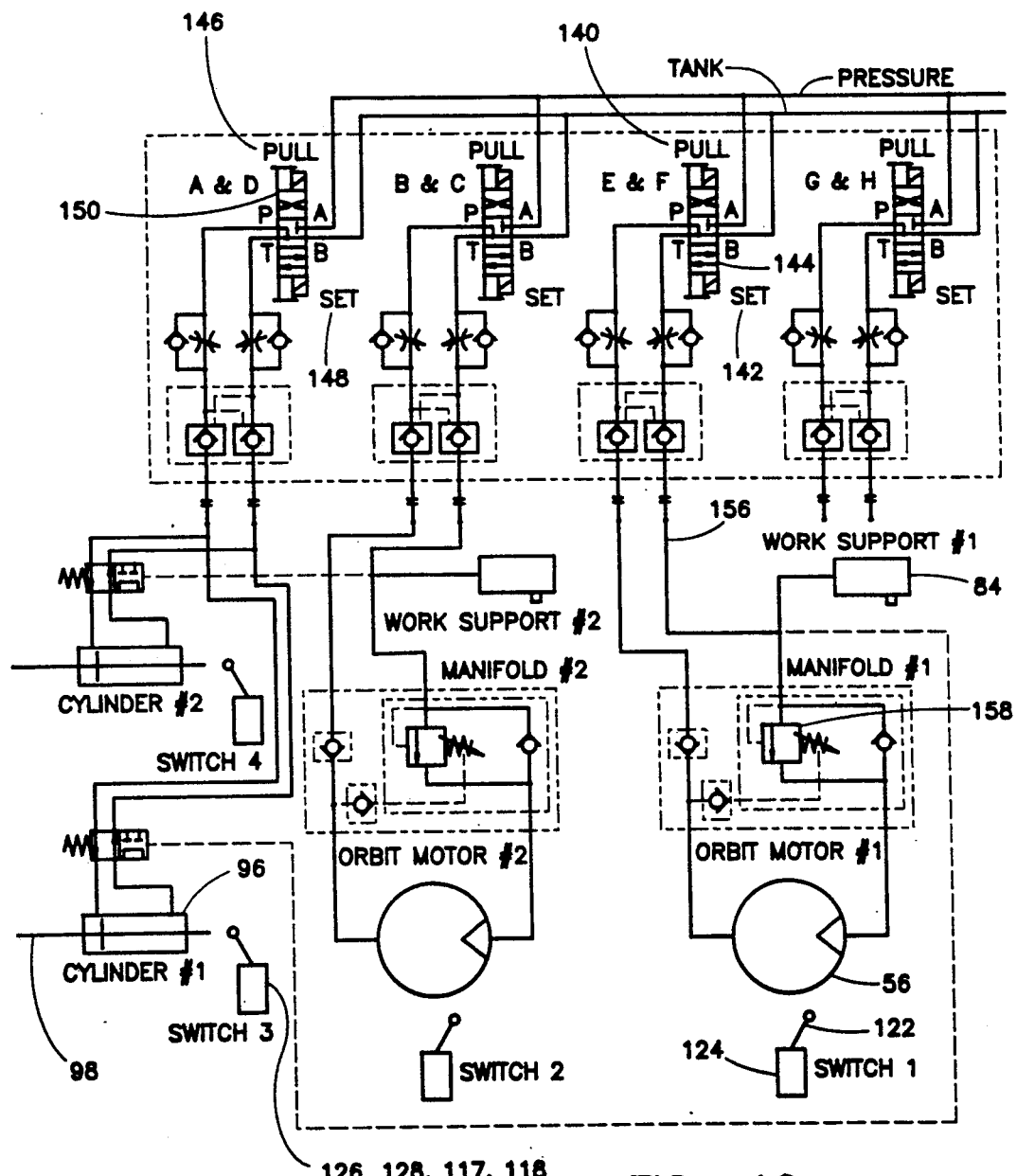
FIG. 10 is a schematic diagram of a hydraulic control system according to the invention.

Hydraulic valve 144, which is illustrated in FIG. 10 in its neutral position, when actuated by pull solenoid 140, applies hydraulic pressure to a line 156. Hydraulic line 156 extends to work stop 84 and, through a sequencing valve 158, to hydraulic motor 56. Accordingly, when pull solenoid 140 is actuated, work stop 84 is actuated. Once work stop 84 is actuated, pressure will continue to build in line 156 until sequencing valve 158 is opened, which will in turn rotate motor 56. When pull solenoid 140 is deenergized, valve 144 returns to its neutral position. While set solenoid 142 is capable of rotating motor 56 in an opposite direction, as will be set forth in more detail below, motor 56 is uni-directionally rotated in the preferred embodiment. However, certain advantages of the invention may still be realized by operating motor 56 bi-directionally. When pull solenoid 146 is energized, valve 150 applies pressure across hydraulic cylinder 96 in a direction that causes the shaft 98 to extend. When set solenoid 148 is actuated, valve 150 causes cylinder 96 to retract shaft 98.

OPERATION

Figure 3:
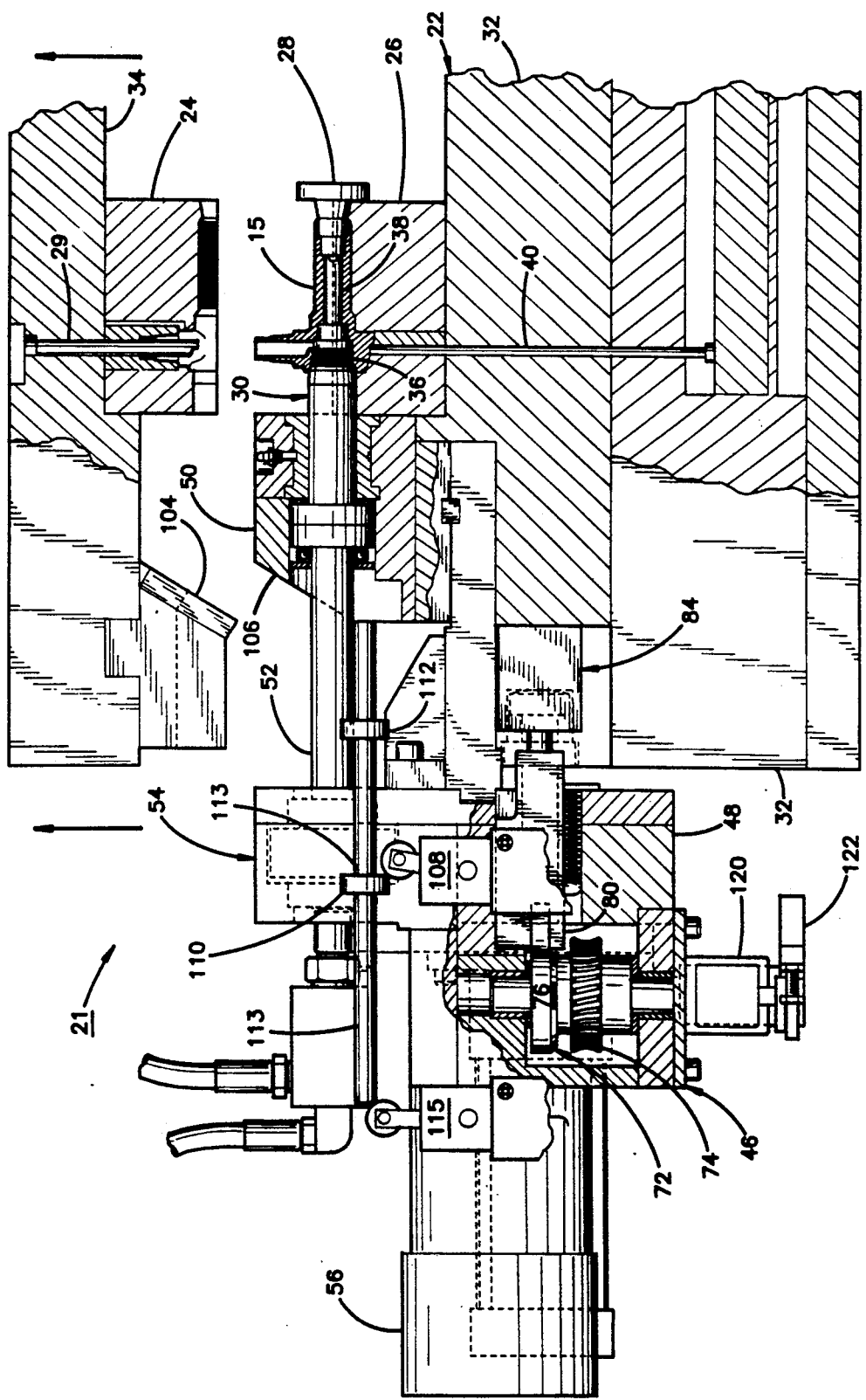
FIG. 3 is the same view as FIG. 2 at another portion of the cycle of the apparatus.
Figure 4:
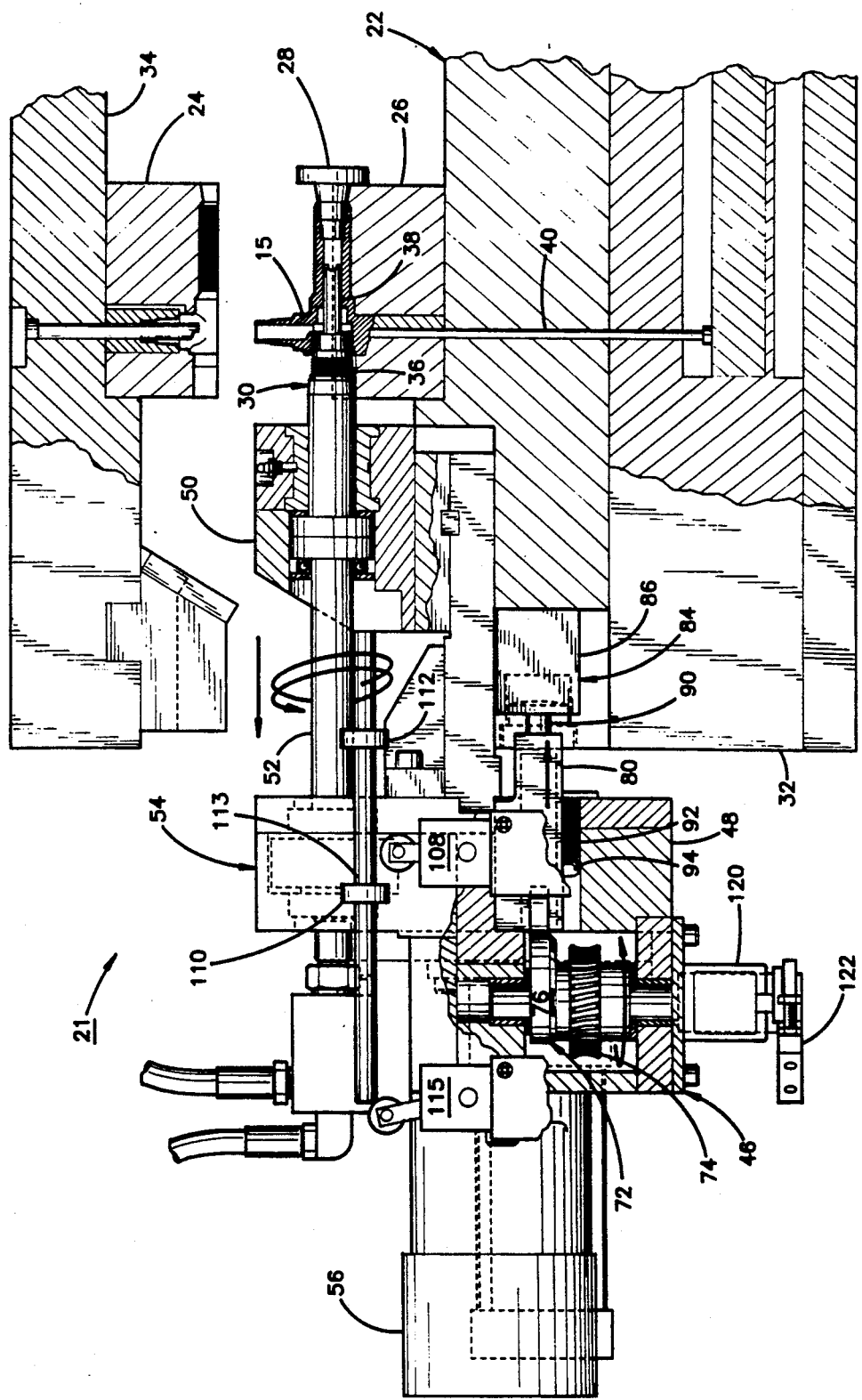
FIG. 4 is the same view as FIG. 2 at yet another portion of the cycle of the apparatus.

Following completion of the a cycle for molding of a fitting 15 as illustrated in FIG. 2, mold cap 34 is elevated such that apparatus 21 is in the configuration illustrated in FIG. 3. Molding apparatus control 44 provides a signal to indicate this status and controller 130 responds by energizing pull solenoid 140 of valve 144. This applies hydraulic pressure to work stop 84 and, when sequencing valve 58 opens in response to the increase in pressure in line 156, orbit motor 56 rotates. As orbit motor 56 rotates, the rotation of cam 72 moves carrier 48 away from molding apparatus 22 while shaft 52 rotates threaded core insert 32, as illustrated in FIG. 4. Shaft 52 is rotated in synchronism with cam 72 as a result of the synchronization provided by drive gear assembly 54 (FIG. 8). The ratio of rotation of shaft 52 to movement of carrier 48 is a function of the pitch of the threaded portion 36 of core insert 30 such that the threaded portion 36 is unthreaded from fitting 15 without placing excessive strain on the newly formed threads 20.

Cam 72 completes one rotation (360°) and actuates cam zero switch 124. However, carrier 48 is moved by cam 72 only during the first 300° of rotation of cam 72 during which the diameter of the cam contacted by cam roller 78 increases. After the first 300° of rotation of cam 72, threaded portion 36 of the core insert will have cleared internally threaded surface 20 of fitting 15. Further rotation of cam 72 decreased the diameter of cam surface 76 that is contacted by cam roller 78. However, this does not result in further movement of carrier 48. It should also be noted that this same mechanism does not return carrier 48 toward the molding apparatus 22. Accordingly, the movement of cam surface 76 from its maximum diameter at 300° of rotation to its minimum diameter at 360° of rotation does not result in further movement of carrier 48.

When controller 130 senses the change in state of line 119 as a result of the cam completing a full revolution to zero, solenoid 146 is actuated to apply pressure to cause double acting hydraulic cylinder 96 to extend as illustrated in FIG. 5. Cylinder 96 will extend until "cylinder out" switch 128 is actuated. The extension of cylinder 96 moves carrier 48 rapidly away from molding apparatus 22 but does not result in additional rotation of shaft 52. This portion of the process retracts extended portion 38 of the mold insert clear of fitting 15. When cylinder 96 is fully extended, controller 130 actuates solenoid 148 which causes cylinder 96 to fully retract, pulling carrier 48 toward molding apparatus 22 to the position illustrated in FIG. 3. This is possible because enlarged portion 100 of the shaft 98 of cylinder 96 is captured within cavity 102, as best seen in FIG. 6. The retraction of cylinder 96 results in the actuation of "cylinder set" switch 126.

Once carrier 48 is returned to the position illustrated in FIG. 3, the mold cap 34 is again brought into contact with mold base 32, under control of molding apparatus controller 44. Heel plate 104, extending angularly downwardly from mold cap 34, engages surface 106 of forward bearing assembly 50 to fixedly position core insert 30 at its proper location between mold halves 24 and 26 as illustrated in FIG. 2.

It may be seen that the above cycle may be completed without reversing direction of orbit motor 56. This saves approximately one second in the cycling of the apparatus by eliminating the need to reverse the motion of the orbit motor. However, conventional molding apparatus control 44 typically requires that the sequence of operation of molding apparatus 22 be carried out in symmetrical fashion, such that each step is retracted in reverse order to the sequence in which it is originally carried out. Accordingly, control 44 would "expect" to receive in order: the "screw out" signal, the "cylinder out" signal, the "screw set" signal and, finally, the "cylinder set" signal. By reference to FIGS. 2 and 11, this is accomplished by the unique arrangement of switches 108, 115 and 120. As the cam beings to rotate, the opening of switch 124 causes "screw set" signal to switch low. As carrier 48 is moved outwardly by the cam rotation, switch 115 will be actuated, as seen in FIG. 4, closing switch 118 and opening switch 117. This does not change the state of signals "screw set" and "screw out" because switch 124 is open. The return of cam zero to the zero position than causes the "screw out" signal to go high when switch 124 closes, which causes the control to extend cylinder 96 and the "cylinder out" signal to go high when limit 112 closes switch 128. On return of carrier 48, as cylinder 96 is being retracted, switch 115 will eventually no longer be actuated which will cause switch 117 to close and switch 118 to open. This will cause the "screw out" signal to go low and the "screw set" signal to go high. Finally, the "cylinder set" signal will go high when switch 126 is closed by limit 110.

Figure 11:
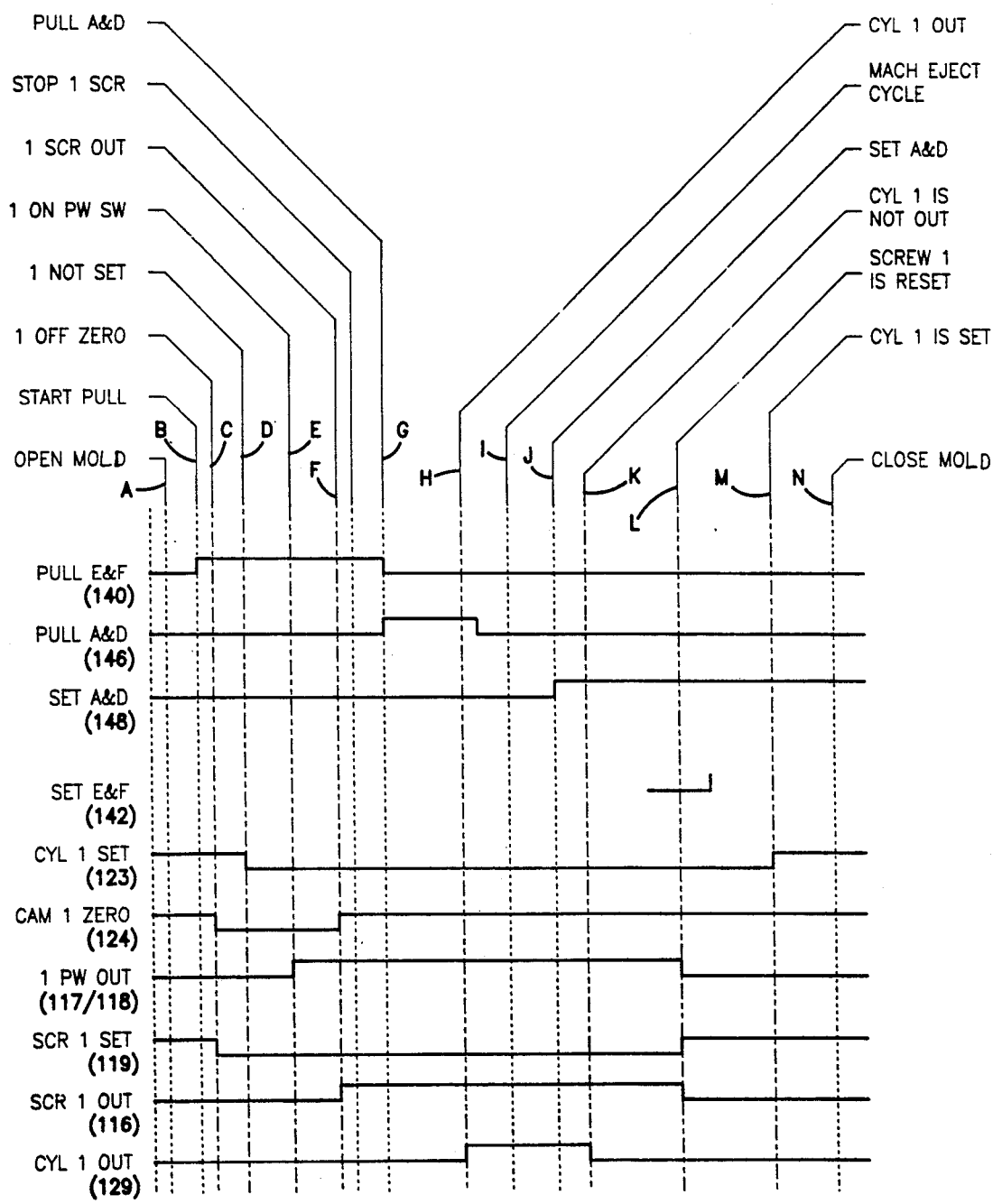
FIG. 11 is a timing chart illustrating the sequence of operation of an apparatus according to the invention.

Operation of the control sequence for apparatus 21 is illustrated in FIG. 11. After controller 130 receives a signal at A that the mold is open, pull solenoid 140 is energized at B, causing actuation of work stop 84 and rotation of orbit motor 56. At point C, cam zero switch 124 indicates that the cam is no longer at zero position and causing "screw set" input on line 119 to controller 130 to go low. At point D, the "cylinder set" switch 126 is actuated as a result of movement of carriage 48 away from molding apparatus 22 indicating that double acting hydraulic cylinder 96 is no longer fully retracted. As further movement of carriage 48 results in further withdrawal of core insert 30, contacts 117 and 118 of partway-out switch 115 change position as switch 115 is actuated, as illustrated in FIG. 4, at point E. At point F, cam zero switch 124 changes state to indicate that the cam has rotated 360 back to the zero position. This additionally causes "screw out" input 116 to controller 130 to indicate that threaded portion 36 of core insert 30 has cleared the internal threads 20 of fitting 15.

In response to the change in state on input 116, controller 130 ceases to energize solenoid coil 140 and energizes coil 146 at point G. This causes cylinder 96 to expand resulting in a change in the output of cylinder out switch 128 at point H, and a subsequent deactuation of set solenoid 146. At point I controller 44 causes the ejection of fitting 15 from apparatus 22 and a subsequent actuation, at point J, of "set" solenoid 148 in order to retract cylinder 96. At point K, "cylinder out" switch 128 is de-actuated. At point L "screw set" input 119 goes high, and input 176 and the "screw out" input 116 goes low in response to deactivation of a "screw part-way-out" switch 115.

The use of a uni-directionally rotated orbit motor to rotate cam 72 in combination with selectively actuatable work stop 84 not only reduces the cycle time by eliminating the necessity to reverse rotation of the orbit motor, but also allows large tolerances in the angle at which cam 72 is stopped after one rotation of the cam. This is a result of the ability of workstop 84 to adjust to the position of cam surface 76, within plus or minus 20 in the illustrated embodiment, while providing precise withdrawal guidance of core insert 30. Furthermore, this arrangement eliminates the accumulation of tolerances because the sequence starts and stops with the actuation of switch contact 124. If orbit motor 56 is operated in a bi-directional mode, such that the orbit motor is reset for each cycle, numerous advantages of the invention are still realized. The use of workstop 84 reduces the necessity for accurate setting of the cam zero switch and core insert 30 may be accurately positioned within the mold each cycle. Furthermore, various thread pitches and diameters may be accommodated merely by the replacement of cam 72.

Other changes and modifications in the specifically described embodiments can be carried out without departing from the principals of the invention which is intended to be limited only by the scope of the appended claims, as interpreted according to the principles of patent law, including the Doctrine of Equivalents.

We claim:

1. An apparatus for use with a molding apparatus for withdrawing a mold core having threads from a mold comprising:
   core rotation means for rotating said core about the axis of said threads;
   withdrawal means for axially withdrawing said core from said mold at a rate that is related to the rate of rotation of said rotating means as a function of the pitch of said threads; and wherein said withdrawal means includes a cam having a cam surface, displacement means for axially displacing said core in response to said cam surface and cam moving means for moving said cam surface in synchronism with said core rotation means.

2. The apparatus in claim 1 wherein said displacement means includes a cam follower adapted to following said cam surface and having a support member that is actuatable in order to reference the position of the core with the cam surface.

3. The apparatus in claim 2 wherein said support member comprises a fluid actuatable cylinder.

4. The apparatus in claim 2 wherein said cam, said cam moving means and said core rotation means are mounted on a common carrier that is displaceable along said axis of said threads and wherein said support member is positioned between said mold and said carrier such that said carrier is displaced as said cam moving means moves said cam.

5. The apparatus in claim 1 wherein said cam moving means uni-directionally rotates said cam.

6. The apparatus in claim 5 wherein said displacement means includes a cam follower having a support member that is actuatable in order to reference the position of the core with the cam surface.

7. A method of molding a product having threads, said method including providing a mold and a threaded mold core wherein said mold and mold core determine at least in part the shape of said product, forming said product in said mold and withdrawing said mold core from said mold, said withdrawing including the steps of:
providing a cam having a cam surface with a predetermined configuration;
moving said cam and rotating said core at a relative rate that is a function of the pitch of said threads and said cam surface configuration; and
displacing the rotating mold core along the axis of said threads in response to said cam surface.

8. The method in claim 7 wherein said step of displacing includes fixing a point on said cam surface with respect to the mold and displacing said cam away from said point.

9. The method in claim 7 wherein said step of moving includes rotating said cam unidirectionally to said point on said cam surface after said step of displacing.

10. An apparatus for use with a molding apparatus for withdrawing a mold core having threads from a mold comprising:
a carrier that is displaceable along the axis of said threads;
means for rotatably mounting said mold core to said carrier;
a cam that is rotatably mounted to said carrier; rotating means for rotating said cam and said mold core at related rates;
said cam having a cam surface with a predetermined configuration that is a function of the pitch of said threads and said related rates; and
follower means fixed with respect to said mold for following said cam surface such that said rotating cam displaces said carrier.

11. The apparatus in claim 10 wherein said follower means includes a support member positioned between said mold and said cam surface and being capable of selectively adapting the length of the follower means to the position on the cam surface being contacted by said follower means.

12. The apparatus in claim 11 wherein said support member includes a fluid actuated cylinder.

13. The apparatus in claim 12 wherein said rotating means includes a fluid actuated motor and switch means responsive to fluid being applied to said cylinder for applying fluid to said motor.

14. The apparatus in claim 13 further including extension means for further displacing said carrier away from said mold after said threads clear said mold.

15. The apparatus in claim 14 wherein said extension means is further capable of displacing said carrier toward said mold in order to reposition said follower means adjacent said cam surface.

16. The apparatus in claim 10 further including extension means for further displacing said carrier away from said mold after said threads clear said mold.

17. The apparatus in claim 16 wherein said extension means is further capable of displacing said carrier toward said mold in order to reposition said follower means adjacent said cam surface.

18. The apparatus in claim 17 wherein said extension means includes a double-acting fluid actuated cylinder.

19. The apparatus in claim 10 wherein said rotating means is unidirectionally rotatable.

20. A method of molding a product having threads including providing a mold and a threaded mold core wherein said mold and said mold core determine at least in part the shape of said product, said method including in sequence the steps of:
(a) forming a product in the mold;
(b) withdrawing the mold core from the mold by axially moving the mold core in the direction of the axis of said threads while rotating said mold core in a given direction and at a rate that is related to the rate of said axially moving according to the pitch of said threads, until the threads on the mold core are clear of the threads of the product, wherein said withdrawing includes providing a cam having a surface, displacement means for axially displacing said core in response to said cam surface and unidirectional drive means for rotating said cam and said core, said displacement means including a cam follower having a support member that is actuatable in order to reference the position of the core with the cam surface, wherein said support member includes a fluid actuatable cylinder and said method further including actuating said cylinder only during step (b);
(c) removing the formed product from the mold; and
(d) inserting mold core in to the mold without substantially rotating said mold core, whereby unidirectional drive means are sufficient to rotate and axially move the core and whereby the core can be reset by axial movement alone.

21. A method of molding a product having threads including providing a mold and a threaded mold core wherein said mold and said mold core determine at least in part the shape of said product, said method including in sequence the steps of:
(a) forming a product in the mold;
(b) withdrawing the mold core from the mold by axially moving the mold core in the direction of the axis of said threads while rotating said mold core in a given direction and at a rate that is related to the rate of said axially moving according to the pitch of said threads, until the threads on the mold core are clear of the threads of the product, wherein said withdrawing includes providing a cam having a surface, displacement means for axially displacing said core in response to said cam surface and unidirectional drive means for rotating said cam and said core, said displacement means including a carrier upon which said cam and said core are mounted, said carrier being displaceable along the axis of said threads;

(c) completing withdrawal of the mold core from the mold by further axially moving the mold core without substantially rotating said mold core including providing an extendable device between said carrier and said mold and extending said extendable device;

(d) removing the formed product from the mold; and (e) inserting mold core in to the mold without substantially rotating said mold core, whereby unidirectional drive means are sufficient to rotate and axially move the core and whereby the core can be reset by axial movement alone.

22. The method in claim 21 wherein said step of inserting includes providing a retractable device between said displacement means and said carrier and retracting said retractable device.

23. A molding apparatus for molding a product having threads comprising:

a mold and a threaded mold core wherein said mild and mold core determine at least in part the shape of said product;

withdrawal means for withdrawing said mold core from said mold until the threads on the mold core are clear of the threads of the product including means for axially moving the mold core in the direction of the axis of said threads at a given rate while rotating said mold core in a given direction and at a rate that is related to the rate of axial movement of said mold core according to the pitch of said threads, wherein said withdrawal means includes a cam having a cam surface, displacement means for axially displacing said core in response to said cam surface and unidirectional drive means for rotating said cam and said core;

means for removing the formed product from the mold; and insertion means for inserting said mold core into said mold without substantially rotating said mold core, whereby unidirectional drive means are sufficient to rotate and axially move the core and whereby the core can be reset by axial movement alone.

24. The apparatus in claim 23 wherein said displacement means includes a cam follower having a support member that is actuatable in order to reference the position of the core with the cam surface.

25. The apparatus in claim 24 wherein said support member includes a fluid actuatable cylinder.

26. The apparatus in claim 25 wherein said withdrawal means includes control means for selectively actuating said actuatable cylinder.

27. The apparatus in claim 26 wherein said cam and said mold core are positioned on a carrier and wherein said insertion means includes a retractable cylinder between said carrier and said mold and means for actuating said retractable cylinder.

28. The apparatus in claim 23 wherein said cam and said mold core are positioned on a carrier and wherein said insertion means includes a retractable cylinder between said carrier and said mold and means for actuating said retractable cylinder.

29. The apparatus in claim 28 further including means for completing withdrawal of said mold core from said mold including extendable means for axially moving said carrier away from said mold.

30. The apparatus in claim 29 wherein said retractable cylinder is also extendable defining said extendable means.

* * * * *

UNITED STATES PATENT AND TRADEMARK OFFICE
CERTIFICATE OF CORRECTION

PATENT NO. : 5,135,700

DATED : August 4, 1992

INVENTOR(S) : Brian L. Williams, et al

It is certified that error appears in the above-identified patent and that said Letters Patent is hereby corrected as shown below:

Column 6, lines 4 and 5:
      After "inputs" delete "that".

Column 6, line 15:
      "abbut" should be --about--.

Column 8, line 13:
      "360" should be --360°--.

Column 8, line 37:
      "20" should be --20°--.

Column 11, line 26, claim 23:
      "said mild" should be --said mold--.

Signed and Sealed this

Sixteenth Day of November, 1993

Attest:

BRUCE LEHMAN

*Attesting Officer*      *Commissioner of Patents and Trademarks*

UNITED STATES PATENT AND TRADEMARK OFFICE
CERTIFICATE OF CORRECTION

Figure 9:
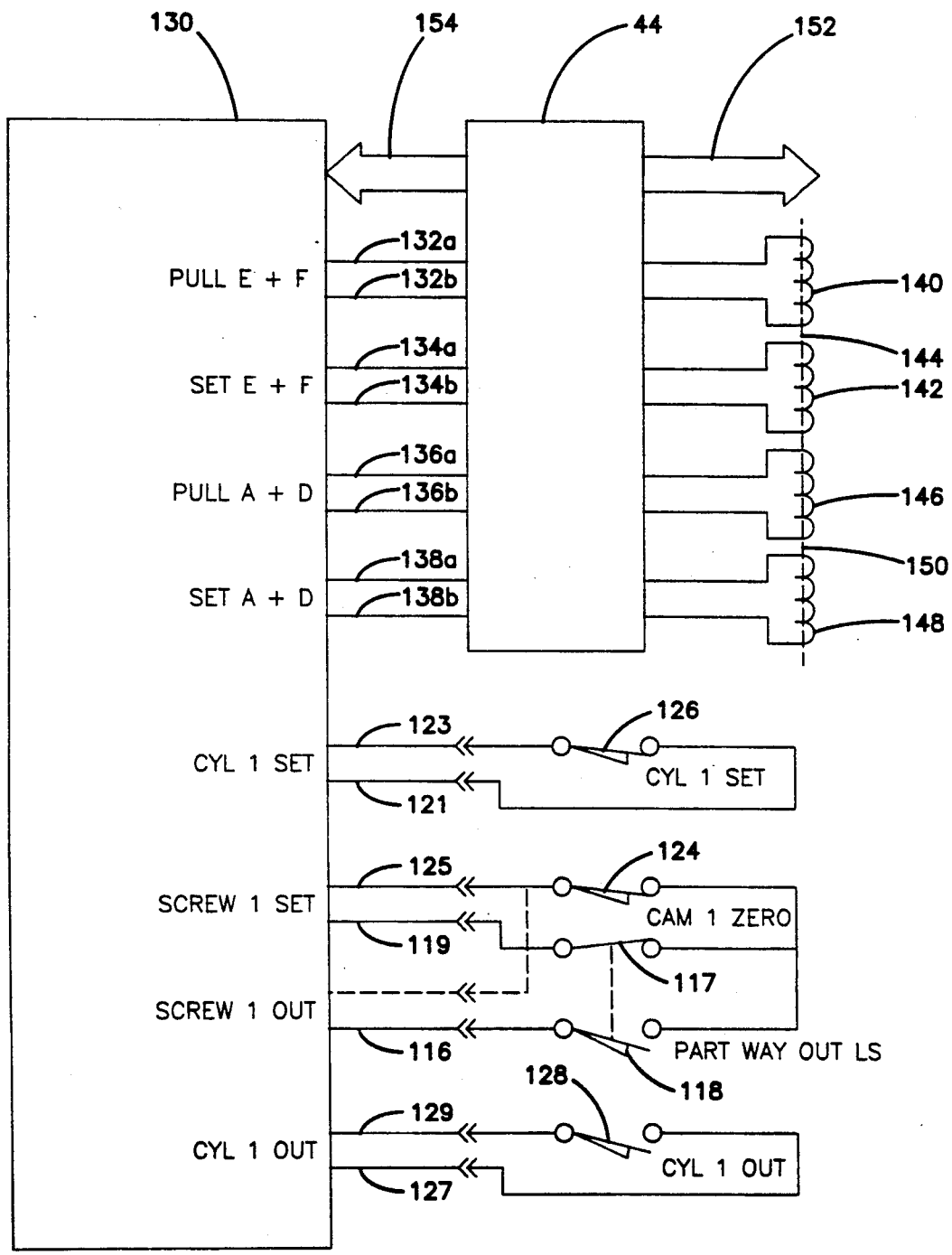
FIG. 9 is a schematic diagram of an electrical control circuit according to the invention.

PATENT NO. : 5,135,700
DATED : August 4, 1992
INVENTOR(S) : Brian L. Williams et al It is certified that error appears in the above-indentified patent and that said Letters Patent is hereby corrected as shown below:

```
Col. 3, line 62, "(FIG. 11)" should be --(FIG. 9)--.
Col. 5, line 64, "117 and 128" should be --117 and 118--.
Col. 6, lines 4 and 5, after "inputs" delete "that".
Col. 6, line 15, "abbut" should be --about--.
Col. 6, line 39, after "of" delete "the" and after "for" insert --the--.
Col. 7, line 46, "and 11" should be --and 9--.
Col. 8, line 13, "360" should be --360°--.
Col. 8, line 37, "20" should be --20°--.
Col. 11, line 26, claim 23, "said mild" should be --said mold--.
```

This certificate supersedes the Certificate of Correction issued November 16, 1993.

Signed and Sealed this

Twenty-first Day of December, 1993

Attest:

BRUCE LEHMAN

Attesting Officer

Commissioner of Patents and Trademarks